US011593308B2

(12) United States Patent
Yaninas

(10) Patent No.: US 11,593,308 B2
(45) Date of Patent: Feb. 28, 2023

(54) MANAGING DATA HIDDEN BY USERSPACE FILESYSTEM

(71) Applicant: Hitachi Vantara LLC, Santa Clara, CA (US)

(72) Inventor: Scott Anthony Yaninas, Allston, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 81 days.

(21) Appl. No.: 17/181,092

(22) Filed: Feb. 22, 2021

(65) Prior Publication Data
US 2022/0269651 A1  Aug. 25, 2022

(51) Int. Cl.
*G06F 16/17*  (2019.01)
*G06F 16/178*  (2019.01)

(52) U.S. Cl.
CPC ........ *G06F 16/1727* (2019.01); *G06F 16/178* (2019.01)

(58) Field of Classification Search
CPC ............................ G06F 16/1727; G06F 16/178
See application file for complete search history.

(56) References Cited

U.S. PATENT DOCUMENTS

2013/0305039 A1\* 11/2013 Gauda ................. H04L 67/1097
  713/153

OTHER PUBLICATIONS

Alluxio, "Unified Namespace", Oct. 30, 2020, https://web.archive.org/web/20201030202004/https://docs.alluxio.io/os/user/stable/en/core-services/Unified-Namespace.html#ufs-metadata-sync (Year: 2020).\*

\* cited by examiner

*Primary Examiner* — Allen S Lin
(74) *Attorney, Agent, or Firm* — Mattingly & Malur, PC

(57) ABSTRACT

In some examples, a system may determine a mountpoint included in a first filesystem for mounting a userspace filesystem. For instance, the userspace filesystem may be executable in a userspace provided by an operating system. The system may determine a bind mount path for a mount path corresponding to the mountpoint. The system may bind mount, to the determined bind mount path, at least a portion of a second filesystem associated with the mount path corresponding to the mountpoint. In addition, the system may mount the userspace filesystem at the mountpoint, and may incorporate data from the second filesystem into the userspace filesystem through the bind mount path.

16 Claims, 6 Drawing Sheets

MANAGING DATA HIDDEN BY USERSPACE FILESYSTEM

BACKGROUND

Traditional filesystems are typically implemented in the kernel of the operating system. On the other hand, a userspace filesystem is a filesystem implemented as a process in the userspace, rather than in the kernel space. For instance, executing in the userspace gives the userspace filesystem access to userspace libraries, application programming interfaces (APIs), and the like, and also provides access to the filesystem itself in a manner similar to other userspace processes.

A mountpoint is a location (e.g., an empty directory) in a currently mounted filesystem (which may be either a kernel space filesystem or a userspace filesystem) where an additional filesystem is mounted. The act of mounting a userspace filesystem at a mountpoint hides any content on an underlying filesystem that may have been previously mounted to the mount path corresponding to the mountpoint. While the userspace filesystem remains mounted at the mountpoint, any data written to that mount path is written to the userspace filesystem. Consequently, the data for the underlying filesystem at the mountpoint before mounting of the userspace filesystem may no longer be visible. Further, the userspace filesystem may become unmounted for a variety of reasons, resulting in the undesirable exposure of the underlying filesystem. If the userspace filesystem becomes unmounted, any data written to the mount path may be written to the underlying filesystem instead of to the intended userspace filesystem. For example, after the userspace filesystem is remounted to the mountpoint, the data written to the mount path may become hidden and difficult to locate.

SUMMARY

In some implementations, a system may determine a mountpoint included in a first filesystem for mounting a userspace filesystem. For instance, the userspace filesystem may be executable in a userspace provided by an operating system. The system may determine a bind mount path for a mount path corresponding to the mountpoint. The system may bind mount, to the determined bind mount path, at least a portion of a second filesystem associated with the mount path corresponding to the mountpoint. In addition, the system may mount the userspace filesystem at the mountpoint, and may incorporate data from the second filesystem into the userspace filesystem through the bind mount path.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION

Figure 1:
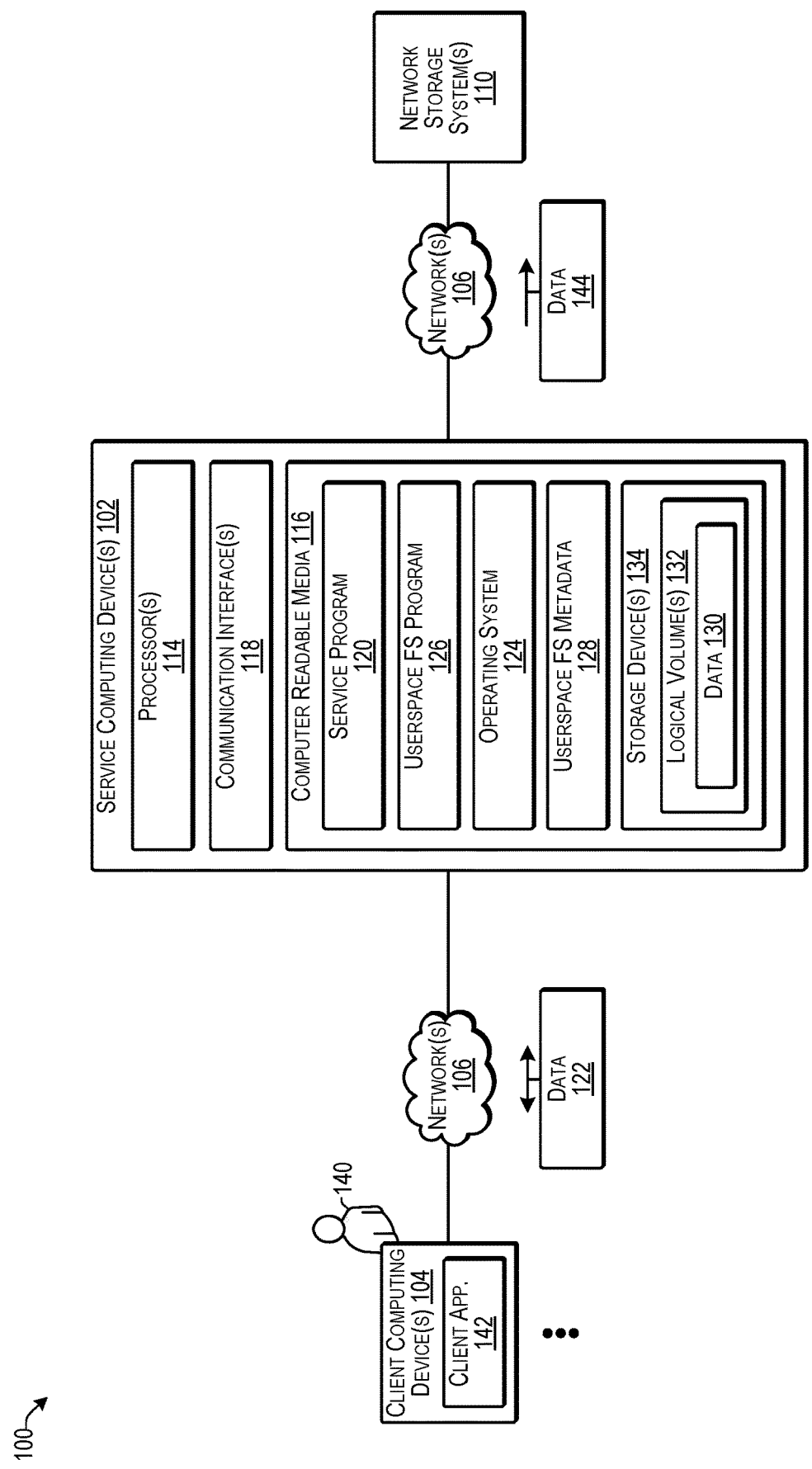
FIG. 1 illustrates an example architecture of a computer system able to execute a userspace filesystem according to some implementations.

Some implementations herein are directed to techniques and arrangements for enabling a userspace filesystem to absorb, incorporate, or otherwise manage data from an underlying filesystem on top of which the userspace filesystem has been mounted. For instance, a data management function may be performed automatically so that the underlying data remains accessible to any applications, users, etc., that may attempt to access the underlying data. Some examples may employ a separate bind mount with a userspace filesystem that allows the userspace filesystem to absorb or otherwise manage data hidden by the mountpoint of the userspace filesystem. In the implementations herein, the underlying data does not need to be copied to another location and potential application downtime may be eliminated for most use cases.

As one example, a computer system that enables userspace filesystems to be mounted and executed may receive an instruction for a mount path, may select a mount path, or may otherwise determine a mount path at which a userspace filesystem is to be mounted. In some situations, there may already be a filesystem mounted at the selected mount path. Before the userspace filesystem is mounted at the mountpoint of the selected mount path, the system may create a separate bind mount and may bind at least a portion of the underlying filesystem mounted at the selected mount path to a new path that is deterministically derived from the selected mount path.

In some examples, the bind mount of at least a portion of the underlying filesystem provides a path to the hidden data of the underlying filesystem through the new bind mount. The bind mount allows the hidden data of the underlying filesystem at the original mount path to be accessed through the bind-mount path even after the userspace filesystem has been mounted to the selected original mount path of the underlying filesystem, which causes the underlying data at the original mount path to become hidden or otherwise inaccessible via the original mount path. After the userspace filesystem is mounted at the original mount path, the userspace filesystem may use the bind-mount path to access the data hidden beneath its own mountpoint and may absorb or otherwise incorporate the data from the underlying filesystem into the newly mounted userspace filesystem.

Implementations herein solve several problems that may result when a userspace filesystem is mounted at a mountpoint of an existing filesystem (which may be a kernel-space filesystem or another userspace filesystem), such that some or all of the files in the underlying existing filesystem are hidden under the newly mounted userspace filesystem. For instance, one problem is the appearance of data loss of the data in the underlying filesystem. In particular, while the underlying data is not actually overwritten, the underlying data may no longer be visible to the application(s) that stored the data because the underlying data is no longer accessible through the original mount path.

In addition, conventionally, following unintended demounting and subsequent remounting, there is no way for the remounted userspace filesystem to determine that some files may be hidden files in the underlying filesystem. For instance, files that belong in the userspace filesystem may become hidden when files are written to the mount-path while the userspace filesystem is unmounted for a period of time, and the files are instead written to the underlying filesystem. When the userspace filesystem is remounted, the files written to the underlying filesystem become hidden. In a system where the userspace filesystem is the authoritative filesystem for the mount-path, the userspace filesystem should be complete and should contain every file written to the mount-path. In some cases, having even a single file missing from the user space filesystem may be unacceptable.

Additionally, assuming that a user realizes that some userspace filesystem files may be hidden in the underlying filesystem, transferring the hidden files from the underlying filesystem to the mounted userspace filesystem may be difficult to do without system downtime, because the underlying filesystem is hidden by the remounted userspace filesystem. For instance, a conventional technique to resolve this issue may require unmounting of the userspace filesystem, copying the hidden files to a temporary filesystem, remounting the userspace filesystem, and merging the hidden files to the remounted userspace filesystem, which may also require a process for resolving version conflicts when the same file exists both in the underlying filesystem as well as in the userspace filesystem.

For discussion purposes, some example implementations are described in the environment of a userspace filesystem mounted at the same mountpoint as an existing filesystem. However, implementations herein are not limited to the particular examples provided, and may be extended to other types of data, other types of computing systems, platforms, and architectures, and so forth, as will be apparent to those of skill in the art in light of the disclosure herein.

FIG. 1 illustrates an example architecture of a computer system 100 able to execute a userspace filesystem according to some implementations. The system 100 includes one or more service computing devices 102 that are able to communicate with, or otherwise coupled to, one or more client computing devices 104, such as through one or more networks 106. In some examples, the service computing device(s) 102 may also communicate over the one or more networks 106 with one or more network storage systems 110, which may be configured to provide additional storage capacity to the service computing device(s) 102.

In the illustrated example, the service computing device(s) 102 may include one or more servers that may be embodied in any number of ways. For instance, the programs, other functional components, and at least a portion of data storage of the service computing device(s) 102 may be implemented on at least one server, which in some cases may be included in a cluster of servers, a server farm, a data center, a cloud-hosted computing service, and so forth, although other computer architectures may additionally or alternatively be used. In the illustrated example, the service computing device(s) 102 include, or may have associated therewith, one or more processors 114, one or more computer-readable media 116, and one or more communication interfaces 118.

Each processor 114 may be a single processing unit or a number of processing units, and may include single or multiple computing units, or multiple processing cores. The processor(s) 114 can be implemented as one or more central processing units, microprocessors, microcomputers, microcontrollers, digital signal processors, graphics processing units, state machines, logic circuitries, and/or any devices that manipulate signals based on operational instructions. As one example, the processor(s) 114 may include one or more hardware processors and/or logic circuits of any suitable type specifically programmed or configured to execute the algorithms and processes described herein. The processor(s) 114 may be configured to fetch and execute computer-readable instructions stored in the computer-readable media 116, which may program the processor(s) 114 to perform the functions described herein.

The computer-readable media 116 may include volatile and nonvolatile memory and/or removable and non-removable media implemented in any type of technology for storage of information, such as computer-readable instructions, data structures, program modules, or other data. Such computer-readable media 116 may include, but is not limited to, RAM, ROM, EEPROM, flash memory or other memory technology, optical storage, solid state storage, magnetic tape, magnetic disk storage, storage arrays, network attached storage, storage area networks, cloud storage, or any other medium that can be used to store the desired information and that can be accessed by a computing device. Depending on the configuration of the service computing device(s) 102, the computer-readable media 116 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 116 may be used to store any number of functional components that are executable by the processor(s) 114. In many implementations, these functional components comprise instructions or programs that are executable by the processor(s) 114 and that, when executed, specifically program the processor(s) 114 to perform the actions attributed herein to the service computing device(s) 102. Functional components stored on the computer-readable media 116 may include a service program 120, which itself may include one or more computer programs, applications, executable code, or portions thereof. For example, the service program 120 may provide communication functionality with the client devices 104 and the network storage system(s) 110, such as for sending and receiving data 122 to and from the client devices 104.

Additionally, the functional components may include an operating system 124 and a userspace filesystem (FS) program 126 that may be executed to create and manage one or more userspace filesystems in a userspace provided by the operating system 124. For example, as is known in the art, the operating system 124 may provide a kernel space in which kernel-level programs execute and a userspace in which userspace-level programs execute. The kernel space may have a substantially higher security level than the userspace. For instance, the kernel may include the core of the operating system 124 that typically has complete control over all parts of a computing device, and may reside in a memory area that is separate from memory areas allocated to the userspace. In some cases, the kernel may provide a software interface between the hardware of the computing device and the user programs executing in the userspace.

In addition, the computer-readable media 116 may store data, data structures, and other information used for performing the functions and services described herein. For example, the computer-readable media 116 may store userspace filesystem (FS) metadata 128. For example, the userspace filesystem metadata 128 may be stored in any suitable type of data structure, such as a metadata database, table, index, or the like, that is used and maintained by the userspace filesystem program 126 when performing some of the functions described herein. In addition, data 130 may be stored on the computer-readable media 116, such as in one or more logical volumes 132 provided by one or more storage devices 134.

The service computing device(s) 102 may also include or maintain other functional components and data, which may include programs, drivers, etc., and the data used or generated by the other functional components. Further, the service computing device(s) 102 may include many other logical, programmatic, and physical components, of which those described above are merely examples that are related to the discussion herein.

The one or more communication interfaces 118 may include one or more software and hardware components for enabling communication with various other devices, such as over the one or more network(s) 106. Thus, the communication interfaces 118 may include, or may couple to, one or more ports that provide connection to the network(s) 106 for communicating with the client computing device(s) 104 and the network storage system(s) 110. For example, the communication interface(s) 118 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

The network(s) 106 may include any suitable network, including a wide area network (WAN), such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired or wireless connection, or any combination thereof. Thus, the network(s) 106 may include both wired and/or wireless communication technologies. Components used for such communications can depend at least in part upon the type of network, the environment selected, or both. Protocols for communicating over such networks are well known and will not be discussed herein in detail. Accordingly, the service computing device(s) 102, the client computing device(s) 104, and the network storage system(s) 110 (when included) are able to communicate over the network(s) 106 using wired or wireless connections, and combinations thereof.

Each client computing device 104 may be any suitable type of computing device such as a desktop, laptop, tablet computing device, mobile device, smart phone, wearable device, and/or any other type of computing device able to send data over a network. A user 140 may be associated with a respective client computing device 104, such as through a respective user account, user login credentials, or the like. Furthermore, the client computing device 104 may be able to communicate with the service computing device(s) 102 through the one or more networks 106 or through any other suitable type of communication connection.

Further, each client computing device 104 may include a respective instance of a client application 142, that may execute on the respective client computing device 104, such as for communicating with the service program 120, e.g., for sending the data 122 and/or for accessing and retrieving the data 122. In some cases, the application 142 may include a browser or may operate through a browser, and the service program 120 may include a web application for enabling the user 140 to access stored data based on communication with the service computing device(s) 102. Alternatively, in other cases, the application 142 may include any other type of application having communication functionality enabling communication with the service program 120 over the one or more networks 106.

Some examples herein may include the network storage system(s) 110, while in other examples, the network storage system(s) 110 are not included. When included in the system 100, the network storage system(s) 110 may include cloud storage systems, remote storage systems, local storage systems or arrays, commercial storage, private storage, or the like, connected via a LAN, WAN, direct connection, or the like, as discussed in detail above, and may be used for storage of a portion of the data 130. Thus, the network storage system(s) 110 may include commercially available cloud storage as is known in the art, while in other examples, the network storage system(s) 110 may include private or enterprise storage systems accessible only by an entity associated with the service computing device(s) 102. As one general example, data on the service computing device(s) 102 stored in one or more of the logical volumes 132 may be moved over time to the network storage system(s) 110 by migrating a portion of the data 130, e.g., data 144. Data 130 that is likely to be used frequently or in the near future may be retained in the logical volume(s) 132.

The service program 120 may be executed on the service computing device(s) 102 to manage the storage of data 130 on the storage device(s) 134. In addition, the userspace filesystem program 126 may execute on the service computing device 102 to provide one or more userspace filesystems for organizing the storage of the data 130. The userspace filesystem program 126 may manage each userspace filesystem for storage of the data 130 on the logical volume(s) 132 and, when included, on the network storage system(s) 110. As one example, the userspace filesystem program 126 may use a filesystem-in-userspace (FUSE) interface or the like to provide a filesystem in the userspace (i.e., outside the operating system kernel space), so that the userspace filesystem may provide a bridge to the actual kernel interfaces. For example, as is known in the art, the kernel space is strictly reserved for running a privileged operating system kernel, kernel extensions, and most device drivers. On the other hand, the userspace may include a memory area where application software and some drivers may execute. Accordingly, the userspace filesystem program 126 executes outside the kernel space and the FUSE interface may provide an interface between the resulting userspace filesystem and the operating system kernel where file-system-level commands are typically executed. In some examples, the operating system 124 on the service computing device(s) 102 may be LINUX, UNIX, or similar type of operating system, but examples herein are not limited to any particular operating system.

Furthermore the userspace filesystem program 126 may maintain the userspace filesystem metadata 128 that includes information about the data 130 stored via the userspace filesystem, such a storage location and other metadata information, e.g., file information, owner, storage policy, and so forth. In some examples, the userspace filesystem metadata 128 may include an in-memory metadata cache (not shown in FIG. 1) to persist filesystem metadata locally and provide extremely fast metadata inquiry performance. Numerous other variations will be apparent to those of skill in the art having the benefit of the disclosure herein.

Figure 2:
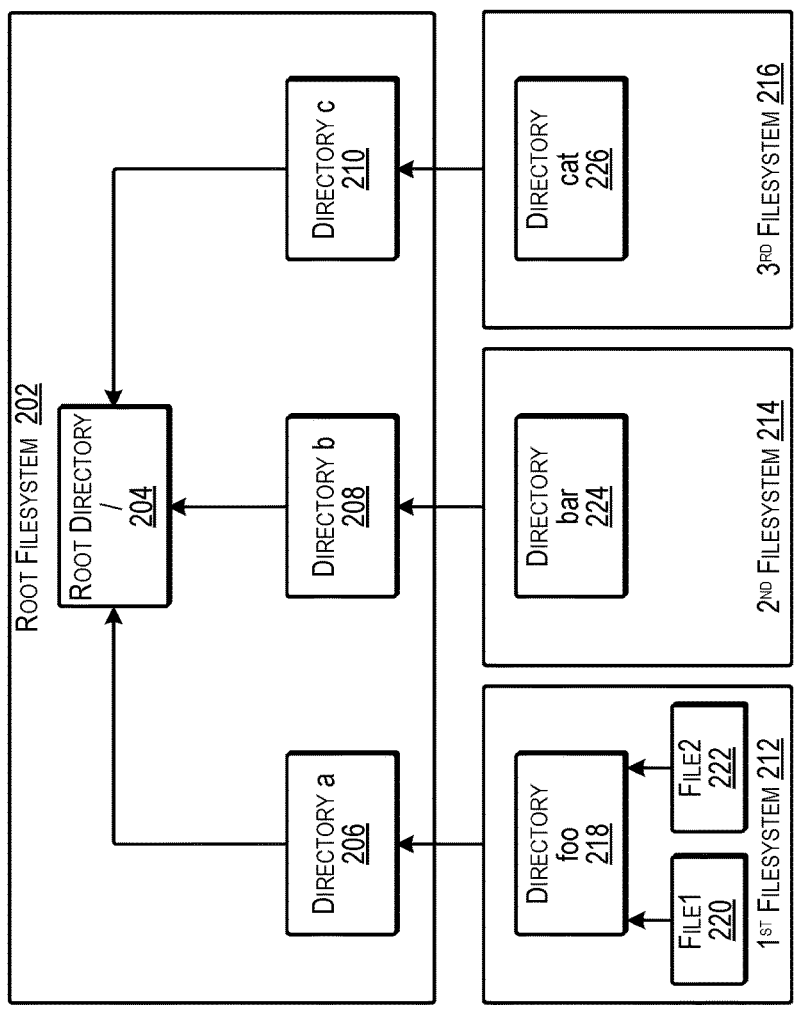
FIG. 2 illustrates an example logical configuration of a plurality of filesystems enabling mounting of a userspace filesystem according to some implementations.

FIG. 2 illustrates an example logical configuration 200 of a plurality of filesystems enabling mounting of a userspace filesystem according to some implementations. For instance, the plurality of filesystems include a directory tree that may be created on at least one service computing device 102 discussed above with respect to FIG. 1. In this example, a root filesystem 202 includes a root directory 204 indicated by a slash "/". The root directory 204 includes three additional directories depending therefrom, namely, directory "a" 206, having a path "/a"; directory "b" 208, having a path "/b"; and directory "c" 210, having a path "/c". Each directory 206, 208, and 210 serves as a respective mountpoint in this example for an additional filesystem. In particular, directory "a" 206 serves as a mountpoint for a first filesystem 212; directory "b" 208 serves as a mountpoint for a second filesystem 214; and directory "c" 210 serves as a mountpoint for a third filesystem 216. The first filesystem 212 includes a directory "foo" 218 including two files, namely file1 220 and file2 222. The second filesystem 214 includes a directory "bar" 224, and the third filesystem 216 includes a directory "cat" 226.

The example of FIG. 2 includes four filesystems (the root filesystem 202, first filesystem 212, second filesystem 214, and the third filesystem 216) which are mounted at four mountpoints (/, /a, /b, and /c, respectively). Furthermore, the following paths are accessible in this example: /, /a, /b, /c, /a/foo, /b/bar, /c/cat, /a/foo/file1, and /a/foo/file2. In this example, the filesystems 202, 212, 214 and 216 may be kernel-space filesystems or userspace filesystems. However, typically, a userspace filesystem may mount to a kernel-space filesystem, but not vice versa. For example, as mentioned above, a kernel-space filesystem executes in the kernel space of the operating system, while a userspace filesystem is a filesystem implemented as a process in the userspace provided by the operating system in a layer separate from the traditional kernel space. By executing in userspace, a userspace filesystem may have easy access to userspace libraries and API, and may also have access to the filesystem (itself or others) like any other userspace process.

Figure 3:
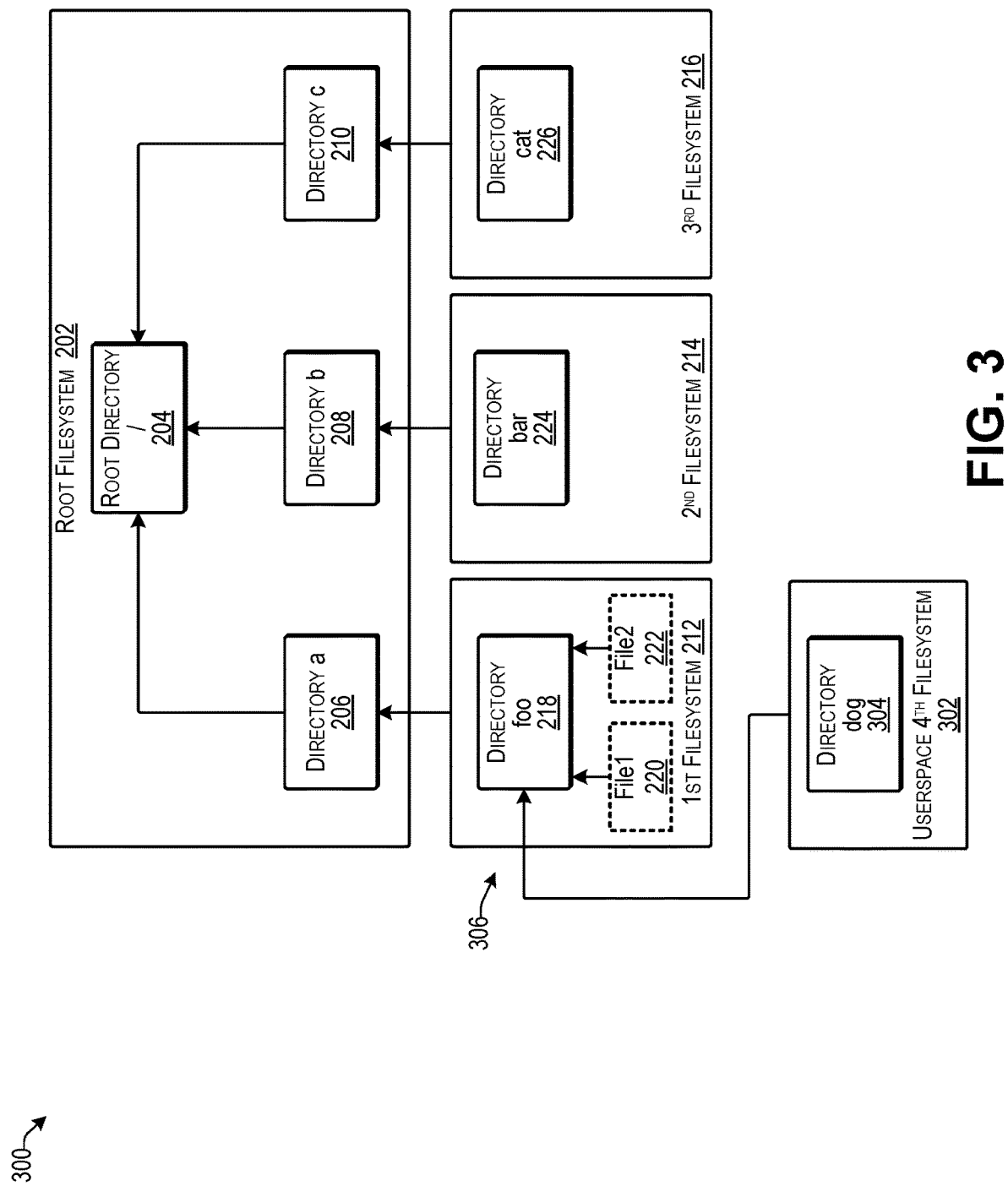
FIG. 3 illustrates an example logical configuration of a plurality of filesystems enabling mounting of a userspace filesystem according to some implementations.

FIG. 3 illustrates an example logical configuration 300 of a plurality of filesystems enabling mounting of a userspace filesystem according to some implementations. In this example, suppose that the system 100 discussed above has determined to mount a userspace filesystem, i.e., a userspace fourth filesystem 302 including the directory "dog" 304, by using directory "foo" 218 as a mountpoint 306. As mentioned above, a mountpoint is a location (such as an empty directory) in a currently mounted filesystem (i.e., the root filesystem 202 in this example) where an additional filesystem is mounted. Mounting a filesystem logically attaches the new filesystem to the directory tree of the system beginning at the mountpoint.

In this example, the selected mountpoint 306 is the directory foo 218, which is included in the first filesystem 212. Typically an empty directory may be selected as a mountpoint for a userspace filesystem; however, in some cases, the system may select a directory that may be initially empty, but that receives data before the userspace filesystem is mounted to the directory. Alternatively, the userspace filesystem may have been previously mounted to the selected directory, may have become unmounted, and the directory may have received data while the userspace filesystem was unmounted. In some cases, any of a plurality of techniques may be employed for selecting a mountpoint for mounting a userspace filesystem. Further, these techniques may be automated in some examples, and may not always determine that a selected mountpoint directory may have received data. Consequently, when the fourth filesystem 302 is mounted to the mountpoint 306, the first filesystem 212 becomes an underlying filesystem that underlies the userspace fourth filesystem 302, and the data in the first filesystem 212, i.e., file1 220 and file2 222, becomes hidden, as indicated by dashed lines. Thus, the fourth filesystem 302 takes over the mount path /a/foo from the first filesystem 212. For instance, the paths /, /a, /b, /c, /a/foo, /b/bar, /c/cat, /a/foo/dog are accessible; however, the paths /a/foo/file1 and /a/foo/file2 are not accessible. In particular, file1 220 and file2 222 are still present on the system, but cannot be accessed through the /a mountpoint.

In some examples, the files 220 and 222 in the underlying first filesystem 212 may not belong in the fourth filesystem 302, and may have originally been intended to belong to the first filesystem 212. As one example, suppose that the client application 142 discussed above with respect to FIG. 1, or another application, stored the file1 220 and file2 222 to the first filesystem under the directory "foo" 218. Accordingly, following mounting of the fourth filesystem 302 over the first filesystem 212, the client application 142 may no longer be able to access file1 220 and file2 222.

As another example, suppose that the fourth filesystem 302 had been previously mounted at the mountpoint 306, and had become unmounted from the mountpoint 302. During the time that the fourth filesystem 302 is unmounted from the mountpoint 306, suppose that the client application 142, or another application, tried to store file1 220 and file2 222 to the fourth filesystem 302, but because the fourth filesystem 302 had become unmounted, the file1 220 and file2 222 were instead stored to the first filesystem 212.

In either of these situations, whether the fourth filesystem 302 is being mounted at the mountpoint 306 for the first time, or is being remounted at the mountpoint 306 after becoming unmounted, the userspace filesystem program 126 may perform additional procedures discussed below during the mounting to ensure that file1 220 and file2 222 remain accessible to the applications and/or users that desire to access these files.

Figure 4:
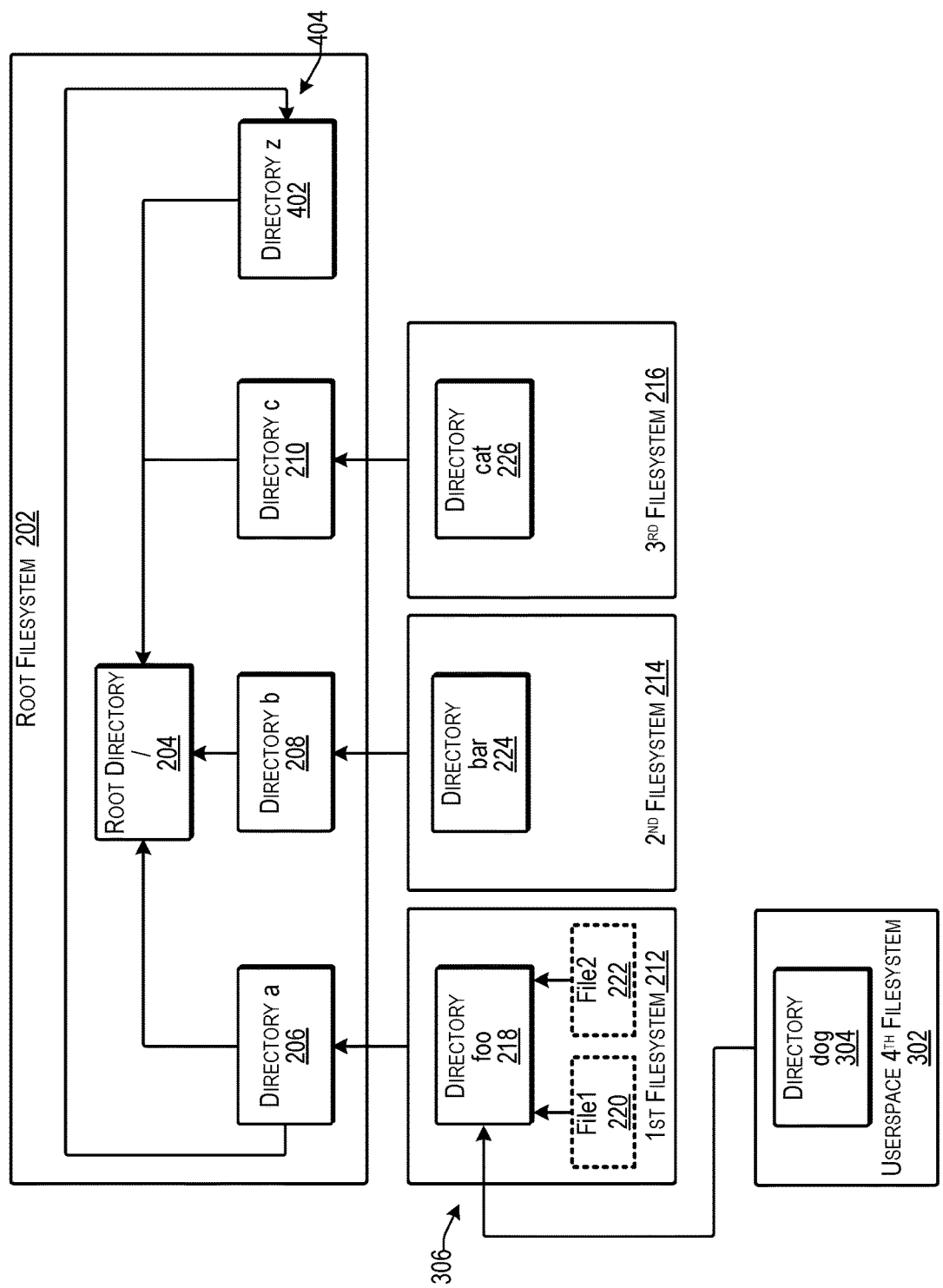
FIG. 4 illustrates an example logical configuration of a plurality of filesystems enabling mounting of a userspace filesystem according to some implementations.

FIG. 4 illustrates an example logical configuration 400 of a plurality of filesystems enabling mounting of a userspace filesystem according to some implementations. In this example, the service computing device 102 (or other computing device executing the userspace filesystem program 126 discussed above) creates directory "z" 402 in the root filesystem 202 to use for creating a bind mount 404 prior to mounting the userspace fourth filesystem 302 to the mountpoint 306. For example, as is known in the art, in general, a bind mount may provide an alternative view of a directory tree and may be mounted in a location that is different from the location of the original view. The bind mount may enable presentation of a filesystem or subtree of a filesystem at a different location in the directory tree, but without changing the actual mountpoint of the underlying filesystem. As one example, the bind mount 404 may be created by the userspace filesystem program 126 sending a request to the operating system 124 to create the bind mount of one path to another. For instance, creating the bind mount 404 may be similar to mounting a filesystem, but with different flags to indicate that the mount is a bind mount.

In this example, the service computing device 102 may use the bind mount 404 to enable the userspace fourth filesystem 302 to absorb or otherwise incorporate the data (e.g., file1 220 and file2 222) hidden by its own mountpoint 306. In some examples herein, the bind mount 404 may be mounted to ignore other mountpoints under itself, which can reveal items hidden by those mountpoints. For instance, ignoring and hiding any additional mountpoints under the source of the bind mount 404 may be the default behavior for a bind mount.

As one example, when the userspace filesystem program 126 receives an instruction or otherwise determines to mount the userspace fourth filesystem 302 at the mountpoint 306, the service computing device 102 may create the bind mount 404 and may bind mount a directory associated with the underlying first filesystem 212 through a bind-mount path. For example, the system may calculate a bind-mount path for creating a bind mount to a directory of the underlying first filesystem 212 based on the mount path (/a/foo) for the selected mountpoint 306. The bind mount may enable access to any data that the userspace fourth filesystem 302 may hide by being mounted (which may include being remounted) at the mountpoint 306. Accordingly, the userspace filesystem program 126 may create the directory 402 (having path "/z") in the root filesystem 202 and then bind mounts the directory a 206 (e.g., the parent directory of the intended mountpoint) to directory z 402.

In the example of FIG. 4, the bind-mount path to the original mountpoint 304 may be calculated as /z. The system may bind mount the directory a 206 at the original mountpath /a to the calculated bind-mount path /z. For example, if the calculated bind-mount path is /z, the parent directory /a of the intended mountpoint directory /a/foo may be bind mounted at the bind-mount path /z to provide access to the hidden data in the first filesystem 212 via the bind-mount path /z. Thus, the bind mount may be performed at the immediate parent ancestor directory that immediately precedes in the directory tree the directory that is the intended mountpoint of the userspace file system. Alternatively, in other examples, the bind mount may be performed at a different ancestor directory that is higher up the directory tree in the direction of the root directory but still within the underlying file system or that serves as the mountpoint of the underlying file system. However, if a higher ancestor directory is used, the userspace filesystem may unnecessarily incorporate additional data (i.e., non-hidden data) into the userspace file system during incorporation of the hidden data, which may increase processing time and the amount of data copied. Accordingly, the bind mount may be performed from any ancestor in the directory tree to /z, and the bind mount may be configured to ignore further mountpoints. Further, while the bind mount may be performed using any directory that is an ancestor of the intended mountpoint of the userspace filesystem and that is also located within the underlying filesystem, or is a mountpoint of the underlying filesystem, selecting the immediate parent of the intended mountpoint of the userspace filesystem may typically be more efficient since the amount of data absorbed by the userspace filesystem may be reduced and there is no need for additional analysis of other directories in the underlying filesystem. Further, while communication between filesystem components may be used to reduce the absorption of unnecessary data in the case that an ancestor directory that is not the immediate parent is selected, this process may add complexity to the system.

Furthermore, the system may set the bind mount 404 at the bind-mount path /z as a private bind mount, and may mount the userspace fourth filesystem 302 at /a/foo, i.e., mountpoint 306. The system may run the userspace fourth filesystem 302 and may execute a hidden data incorporation algorithm of the userspace filesystem program 126, as discussed, e.g., with respect to FIG. 6 below. For instance, the hidden data (i.e., file1 220 and file2 222) may be incorporated into the userspace fourth filesystem 302 to enable access to the data in the underlying first filesystem 212 through the original mountpoint 306.

In the example of FIG. 4, five filesystems 202, 212, 214, 216, and 302 are mounted at six mountpoints: /, /a, /b, /c, /z, /a/foo. Thus, the first filesystem 212 is mounted at both /a and /z. In addition, the following paths are accessible: /, /a, /b, /c, /z, /a/foo, /b/bar, /c/cat, /z/foo, /a/foo/dog, /z/foo/file1, /z/foo/file2.

In addition, after the userspace fourth filesystem 302 is mounted at the mountpoint 306, the userspace fourth filesystem 302 may begin incorporating hidden data into the userspace fourth filesystem 302 through the bind mount path. For example, the system may access a directory of the bind mount path (/z/foo in this example), and if the directory is empty, there is no hidden data to incorporate. On the other hand, if the directory /z/foo is not empty, the system may traverse the directory tree of the bind-mount directory. For each entry in the bind-mount directory, the system may calculate the path of the entry relative to the userspace fourth filesystem 302, and may add the metadata for the entry to the metadata for the userspace fourth filesystem 302. In the situation that the entry itself is a second directory, the system may access the second directory recursively to add metadata for each entry. In some examples, the system may wait for a threshold period of time and then check to see if any metadata has changed for entries in the bind mount directory tree. For example, if a write to the first filesystem 212 was occurring, the metadata may have changed.

Following elapse of the threshold time, the system may again traverse the bind mount directory tree, and if a difference in metadata is found, may again wait for the threshold period and re-traverse the bind mount directory tree, and may repeat these steps until no differences in metadata are found between the metadata of the bind mount directory tree and the metadata added to the userspace fourth filesystem 302. After this has been determined, the system may copy the data (e.g., file1 220 and file2 222) from the bind mount path into the userspace fourth filesystem 302 and, in some cases, may delete the data from the bind mount path following incorporation into the userspace fourth filesystem 302. For example, in the situation in which the data was originally intended to be stored in the userspace fourth filesystem 302, but was instead stored in the first filesystem 212 because the userspace fourth filesystem 302 was temporarily unmounted, the data may be deleted from the bind mount path (e.g., marked as deleted and eventually overwritten). On the other hand, in the situation in which the data is actually supposed to be included in the first filesystem 212, the data might not be deleted. When it is desired to stop running the userspace fourth filesystem 302, the system may unmount the userspace fourth filesystem 302 from the mountpoint 306 and may unmount the bind mount mounted at /z/foo.

Figure 5:
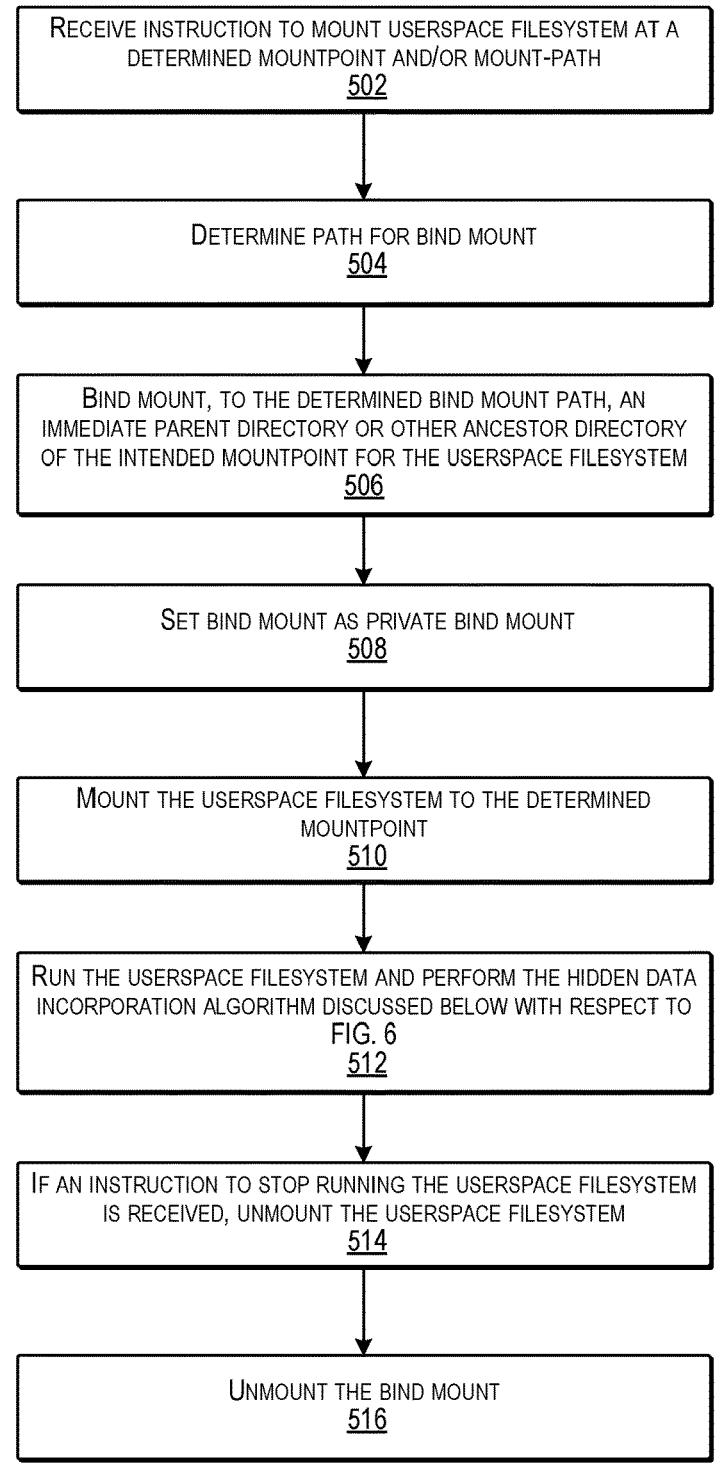
FIG. 5 is a flow diagram illustrating an example process for mounting and unmounting a userspace filesystem according to some implementations.
Figure 6:
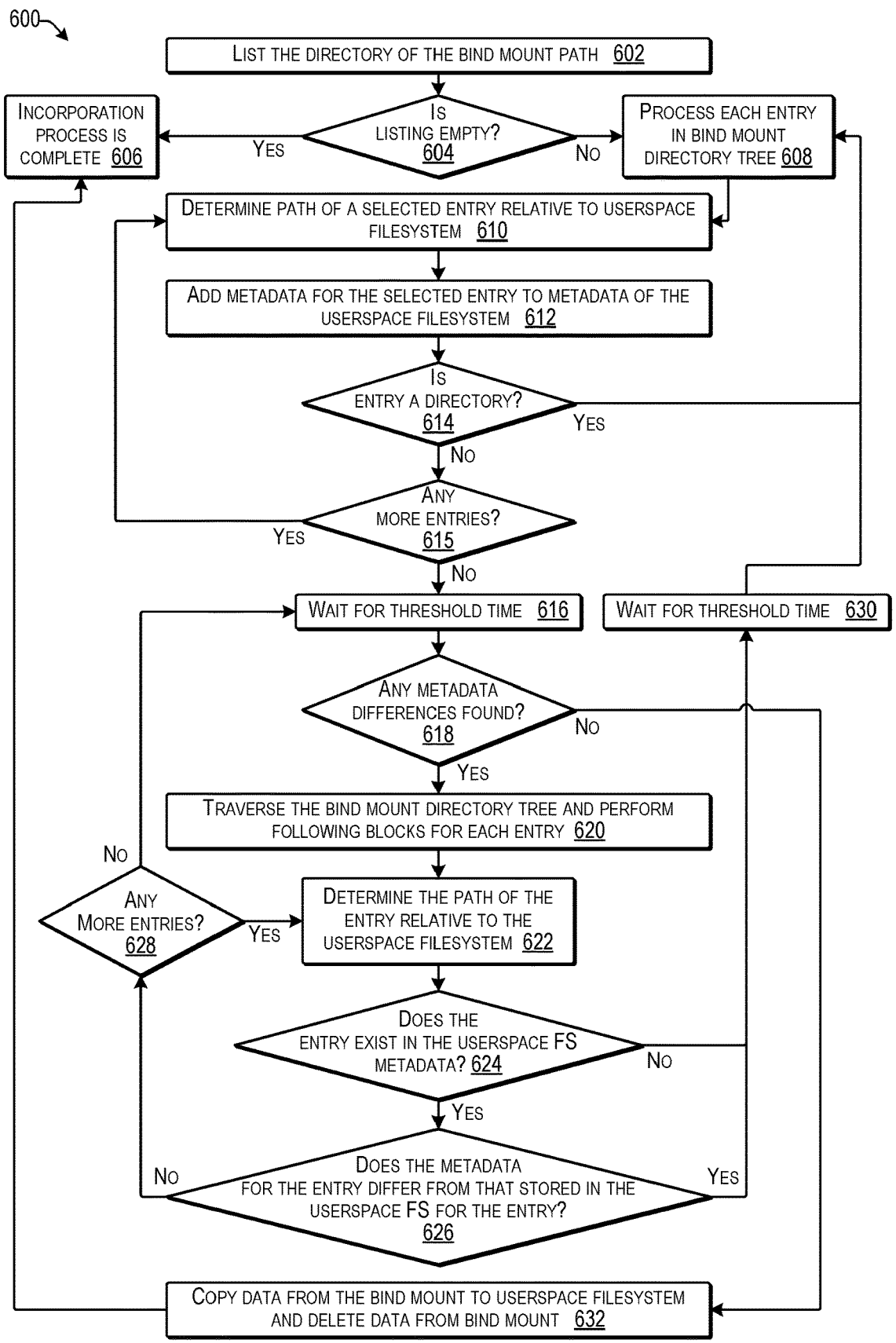
FIG. 6 is a flow diagram illustrating an example process for incorporating hidden data from an underlying filesystem into a userspace filesystem according to some implementations.

FIGS. 5 and 6 include flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

FIG. 5 is a flow diagram illustrating an example process 500 for mounting and unmounting a userspace filesystem according to some implementations. In some cases, the process 500 may be executed at least in part by the service computing device(s) 102 or other suitable computing device, such as by execution of the userspace filesystem program 126. For instance, the userspace filesystem program 126 (or other suitable program) may include executable instructions executable by the one or more processors 114 for performing at least part of the process 500 of FIG. 5.

At 502, the computing device may receive an instruction to mount a userspace filesystem at a determined mountpoint and/or mount path. For instance, the mount path may correspond to a mountpoint specified or otherwise determined for mounting the userspace filesystem. In some cases, the userspace filesystem may have been previously mounted at the mountpoint and may intended to be remounted, while in other cases, the userspace filesystem may intended to be mounted at the mountpoint for the first time. In the example of FIG. 4, the intended mountpoint is /a/foo and the parent directory of the intended mountpoint is /a (directory a 206).

At 504, the computing device may determine a path for a bind mount. For example, the computing device may determine a bind-mount path for the bind mount based on the specified mount path prior to mounting the userspace filesystem. In the example, of FIG. 4, the bind mount path is calculated as /z.

At 506, the computing device may bind mount, to the determined bind mount path, an immediate parent directory or other ancestor directory of the intended mountpoint directory. In the example of FIG. 4, the computing device bind mounts the immediate parent directory /a (directory a 206) of the intended mountpoint directory /a/foo (directory foo 218) to the bind mount path /z. As mentioned above, bind mounts are known in the art. For instance, the bind mount may be created based on the userspace filesystem program sending a request to the operating system to create the bind mount. For example, creating the bind mount may be similar to mounting a filesystem, but with different flags to indicate that the mount is a bind mount. As one example, the immediate parent directory for the bind mount may be the ancestor directory that is immediately above the intended mountpoint in the directory tree in the direction of the root directory. Further, as mentioned above, in other examples, the computing device may bind mount any ancestor directory that is an ancestor of the intended mountpoint of the userspace filesystem and that is also located within the underlying filesystem, or that is a mountpoint of the underlying filesystem. Nevertheless, as also mentioned above, bind mounting an ancestor directory further up the filesystem tree from the immediate parent directory may be less efficient than bind mounting the immediate parent.

At 508, the computing device may set the bind mount as a private bind mount. The private setting may affect how an unmount operation may be propagated to other mountpoints under the mountpoint being unmounted. Accordingly, setting the bind mount as private indicates that an unmount operation that is applied to the bind mount should not be propagated to other mounts. The private setting may also act as a safety measure, since even though nothing else might be expected to be mounted, the private setting can prevent other mounts from being accidentally unmounted if that were to happen.

At 510, the computing device may mount the userspace filesystem to the determined mountpoint. For example, the userspace filesystem may be mounted at the determined mountpoint for the determined mount path. In the example of FIG. 4, the mount path may be /a/foo.

At 512, the computing device may run the userspace filesystem, which may include performing the hidden data incorporation algorithm discussed below with respect to FIG. 6. In some examples, the userspace filesystem may execute until a stop is requested.

At 514, if an instruction to stop running the userspace filesystem is received, the computing device may unmount the userspace filesystem. For example, if it is desired to stop running and remove the userspace filesystem, the userspace filesystem may be unmounted from the mountpoint. In the example of FIG. 4, the userspace filesystem is unmounted from /a/foo.

At 516, the computing device may unmount the bind mount. For example, unmounting of the userspace filesystem may re-expose the hidden data of the underlying filesystem. In the example, of FIG. 4, the bind mount mounted at /z may be unmounted.

FIG. 6 is a flow diagram illustrating an example process 600 for incorporating hidden data from an underlying filesystem into a userspace filesystem according to some implementations. In some cases, the process 600 may be executed at least in part by the service computing device(s) 102 or other suitable computing device, such as by execution of the userspace filesystem program 126. For instance, the userspace filesystem program 126 or other suitable program may include executable instructions executable by the one or more processors 114 for performing at least part of the process 600 of FIG. 6.

At 602, the computing device may access and list the directory of the bind mount path. For instance, the computing device may list each entry in the directory.

At 604, the computing device may determine whether the listing is empty. If so, the process goes to 606. If not, the process goes to 608.

At 606, the computing device may determine that the incorporation process 600 is complete.

At 608, the computing device may traverse the directory tree and may process each entry in the bind mount directory tree.

At 610, the computing device may determine a path of a selected entry relative to the userspace filesystem.

At 612, the computing device may add metadata for the selected entry to the metadata of the userspace filesystem.

At 614, the computing device may determine whether the selected entry is another directory. If so, the process goes back to 608 to recursively process each entry in the other directory before moving on to process the next entry in the first (top) directory. If not, the process goes to 615.

At 615, the computing device may determine whether all entries if the bind mount directory tree have been processed. If so, the process goes to 616. If not, the process goes back to 610 to process a next entry.

At 616, the computing device may wait for a threshold time. For example, if a file is currently being written, the metadata for at least a portion of the directory tree may change.

At 618, the computing device may determine if there are any differences between the metadata for the bind mount directory tree and the metadata added to the metadata of the userspace filesystem. If there are no differences, the process goes to 632. If there are differences, the process goes to 620.

At 620, the computing device may traverse the bind mount directory tree and perform at least blocks 622 and 624 for each entry.

At 622, the computing device may determine the path of a selected entry relative to the userspace filesystem.

At 624, the computing device may determine if the entry already exists in the userspace filesystem metadata. If not, the process goes to 630. If so, the process goes to 626.

At 626, the computing device may determine whether the metadata for the entry differs from that stored in the metadata of the userspace file for the entry. If so, the process goes to 630. If not, the process goes to 628.

At 628, the computing device may determine whether all entries if the bind mount directory tree have been processed. If so, the process goes to 616. If not, the process goes back to 622 to process a next entry.

At 630, the computing device may wait for a threshold time. For example, if a file is currently being written, the metadata for at least a portion of the directory tree may change.

At 632, when no metadata differences are found between the bind mount directory tree and the metadata added to the userspace filesystem, the computing device may copy data from the bind mount to the userspace filesystem. In some example, such as in the case in which the data was originally intended to be stored in the userspace filesystem, but was instead stored in the underlying filesystem because the userspace filesystem was temporarily unmounted, the data may be deleted from the bind mount path (e.g., marked as deleted and eventually overwritten). On the other hand, such as in the case in which the data was supposed to be included in the underlying filesystem, the data might not be deleted. In either case, the previously hidden data may now be accessed through the userspace filesystem. Furthermore, the above-describe process avoids the need for the hidden data to be copied to a side location and then copied back into the userspace filesystem. In addition, applications using the userspace filesystem mountpoint may typically not need to be restarted. Further, during execution of the data incorporation process 600 of FIG. 6, the userspace filesystem is still available to serve other data access requests for existing data already contained in the userspace filesystem while the underlying hidden data is being incorporated into the userspace filesystem.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
one or more processors configured by executable instructions to perform operations comprising:
providing a directory tree including a root filesystem with a root directory and a plurality of directories depending from the root directory, respective directories of the plurality of directories able to serve as mountpoints for respective filesystems mounted to the respective mountpoints, wherein a respective mountpoint to which a respective filesystem is mounted logically attaches the respective filesystem to the directory tree at the respective directory serving as the respective mountpoint;
determining a first mountpoint provided by a first directory of the plurality of directories depending from the root directory, wherein the first directory is associated with a first filesystem, wherein the first mountpoint is determined for mounting, to the first mountpoint, a userspace filesystem executable in a userspace provided by an operating system executing on the one or more processors, wherein a second filesystem including one or more files is already associated with the first mountpoint;
determining a first mount path corresponding to the first mountpoint, the first mount path describing a location of the first mountpoint in the directory tree;
determining a bind mount path for the first mount path corresponding to the first mountpoint, the bind mount path describing a location of an ancestor directory of the first directory corresponding to the first mountpoint, wherein the ancestor directory is included in the first filesystem;
creating a bind mount for bind mounting, to the determined bind mount path, the ancestor directory of the first directory providing the first mountpoint, wherein the ancestor directory is associated with the first filesystem corresponding to the first mount path, wherein the bind mount provides an alternative view of a portion of the directory tree descending from the ancestor directory and ignores mountpoints under the ancestor directory;
mounting the userspace filesystem at the first mountpoint;

incorporating metadata from the second filesystem into metadata of the userspace filesystem through the bind mount path; and incorporating the one or more files from the second filesystem into the userspace filesystem by copying the one or more files based at least on the metadata from the second filesystem incorporated into the metadata of the userspace filesystem.

2. The system as recited in claim 1, the operation of incorporating metadata from the second filesystem into metadata of the userspace filesystem through the bind mount path further comprising:

accessing a directory of the bind mount path to determine at least one entry; and adding metadata for the at least one entry to the metadata of the userspace filesystem.

3. The system as recited in claim 2, the operations further comprising:

waiting for a threshold time; and checking for differences between the metadata for the at least one entry and the metadata added to the metadata of the userspace filesystem.

4. The system as recited in claim 3, the operations further comprising, based at least on failing to find a difference, copying the one or more files into the userspace filesystem.

5. The system as recited in claim 3, the operations further comprising:

based at least on finding a difference, adding at least the different metadata for the at least on entry to the metadata of the userspace filesystem;

waiting for an additional threshold time; and checking again for any differences between current metadata for the at least one entry and at least the different metadata added to the metadata of the userspace filesystem.

6. The system as recited in claim 1, wherein the ancestor directory is within the second filesystem or serves as a mountpoint for the second filesystem.

7. A method comprising:

providing a directory tree including a root filesystem with a root directory and a plurality of directories depending from the root directory, respective directories of the plurality of directories able to serve as mountpoints for respective filesystems mounted to the respective mountpoints, wherein a respective mountpoint to which a respective filesystem is mounted logically attaches the respective filesystem to the directory tree at the respective directory serving as the respective mountpoint;

determining, by one or more processors, a first mountpoint provided by a first directory of the plurality of directories depending from the root directory, wherein the first directory is included in a first filesystem, wherein the first mountpoint is determined for mounting, to the first mountpoint, a userspace filesystem, wherein the userspace filesystem is executable in a userspace provided by an operating system executed by the one or more processors, wherein a second filesystem including one or more files is already associated with the first mountpoint;

determining a first mount path for corresponding to the first mountpoint, the first mount path describing a location of the first mountpoint in the directory tree;

determining a bind mount path for the first mount path corresponding to the first mountpoint, the bind mount path describing a location of an ancestor directory of the first directory corresponding to the first mountpoint, wherein the ancestor directory is included in the first filesystem;

creating a bind mount for bind mounting, to the determined bind mount path, the ancestor directory of the first directory providing the first mountpoint, wherein the ancestor directory is associated with the first filesystem corresponding to the first mount path, wherein the bind mount provides an alternative view of a portion of the directory tree descending from the ancestor directory and ignores mountpoints under the ancestor directory;

mounting the userspace filesystem at the first mountpoint;

incorporating metadata from the second filesystem into metadata of the userspace filesystem through the bind mount path; and incorporating the one or more files from the second filesystem into the userspace filesystem by copying the one or more files based at least on the metadata from the second filesystem incorporated into the metadata of the userspace filesystem.

8. The method as recited in claim 7, wherein incorporating the metadata from the second filesystem into the metadata of the userspace filesystem through the bind mount path further comprises:

accessing a directory of the bind mount path to determine at least one entry; and adding metadata for the at least one entry to the metadata of the userspace filesystem.

9. The method as recited in claim 8, further comprising:

waiting for a threshold time; and checking for differences between the metadata for the at least one entry and the metadata added to the metadata of the userspace filesystem.

10. The method as recited in claim 9, further comprising, based at least on failing to find a difference, copying the one or more files corresponding to the added metadata into the userspace filesystem.

11. The method as recited in claim 7, wherein the ancestor directory is within the second filesystem or serves as a mountpoint for the second filesystem.

12. A non-transitory computer readable medium storing instructions executable by one or more processor to configure the one or more processors to perform operations comprising:

providing a directory tree including a root filesystem with a root directory and a plurality of directories depending from the root directory, respective directories of the plurality of directories able to serve as mountpoints for respective filesystems mounted to the respective mountpoints, wherein a respective mountpoint to which a respective filesystem is mounted logically attaches the respective filesystem to the directory tree at the respective directory serving as the respective mountpoint;

determining a first mountpoint provided by a first directory of the plurality of directories depending from the root directory, wherein the first directory is included in a first filesystem, wherein the first mountpoint is determined for mounting, to the first mountpoint, a userspace filesystem, wherein the userspace filesystem is executable in a userspace provided by an operating system executed by the one or more processors, wherein a second filesystem including one or more files is already associated with the first mountpoint;

determining a first mount path for corresponding to the first mountpoint, the first mount path describing a location of the first mountpoint in the directory tree;

determining a bind mount path for the first mount path corresponding to the first mountpoint, the bind mount path describing a location of an ancestor directory of the first directory corresponding to the first mountpoint, wherein the ancestor directory is included in the first filesystem;

creating a bind mount for bind mounting, to the determined bind mount path, the ancestor directory of the first directory providing the first mountpoint, wherein the ancestor directory is associated with the first filesystem corresponding to the first mount path, wherein the bind mount provides an alternative view of a portion of the directory tree descending from the ancestor directory and ignores mountpoints under the ancestor directory;

mounting the userspace filesystem at the first mountpoint;

incorporating metadata from the second filesystem into metadata the userspace filesystem through the bind mount path; and incorporating the one or more files from the second filesystem into the userspace filesystem by copying the one or more files based at least on the metadata from the second filesystem incorporated into the metadata of the userspace filesystem.

13. The non-transitory computer readable medium as recited in claim 12, the operation of incorporating the metadata from the second filesystem into the metadata of the userspace filesystem through the bind mount path further comprising operations of:

accessing a directory of the bind mount path to determine at least one entry; and adding metadata for the at least one entry to the metadata of the userspace filesystem.

14. The non-transitory computer readable medium as recited in claim 13, the operations further comprising:

waiting for a threshold time; and checking for differences between the metadata for the at least one entry and the metadata added to the metadata of the userspace filesystem.

15. The non-transitory computer readable medium as recited in claim 14, the operations further comprising, based at least on failing to find a difference, copying the one or more files corresponding to the added metadata into the userspace filesystem.

16. The non-transitory computer readable medium as recited in claim 12, wherein the ancestor directory is within the second filesystem or serves as a mountpoint for the second filesystem.

* * * * *